United States Patent [19]

Shigihara et al.

[11] Patent Number: 4,814,904

[45] Date of Patent: Mar. 21, 1989

[54] METHOD OF CONTROLLING ERASING FOLLOWING FORMAT WRITING IN A MAGNETIC DISC APPARATUS

[75] Inventors: Kimiko Shigihara, Wako; Masahiro Nakayama; Akira Kurano, both of Odawara, all of Japan

[73] Assignee: Hitachi, Ltd., Tokyo, Japan

[21] Appl. No.: 853,930

[22] Filed: Apr. 21, 1986

[30] Foreign Application Priority Data

Apr. 19, 1985 [JP] Japan ..... 60-82325

[51] Int. Cl.[4] ..... G11B 19/04; G11B 5/024

[52] U.S. Cl. ..... 360/60; 360/66

[58] Field of Search ..... 360/18, 27, 31, 13, 360/39, 40, 48, 49, 57, 60, 66, 69, 72.1, 72.2, 50, 61; 364/900, 200; 369/32

[56] References Cited

U.S. PATENT DOCUMENTS

| | | | |
|---|---|---|---|
| 3,801,969 | 4/1974 | Sordello et al. | 360/66 |
| 3,824,563 | 7/1974 | Lutz | 364/900 |
| 4,507,693 | 3/1985 | Matsuda et al. | 360/72.2 |

FOREIGN PATENT DOCUMENTS

| | | | |
|---|---|---|---|
| 0140696 | 5/1985 | European Pat. Off. | 360/72.2 |
| 56-93156 | 7/1981 | Japan | 360/48 |
| 58-6510 | 1/1983 | Japan | 360/57 |
| 58-105434 | 6/1983 | Japan | 360/72.1 |
| 60-7671 | 1/1985 | Japan | 360/72.2 |
| 60-167128 | 8/1985 | Japan | 369/32 |

*Primary Examiner*—Alan Faber
*Assistant Examiner*—Steven R. Garland
*Attorney, Agent, or Firm*—Antonelli, Terry & Wands

[57] ABSTRACT

A method of controlling a magnetic disc apparatus. When a format writing is performed on a designated track portion, information of the location of the latest format writing record is read out from a control table storing information of the locations of the records of the format writings performed already to be compared with the information of location of the designated track portion where the format writing is to be currently performed. In dependence on the result of the comparison, it is decided whether erasing operation for the remaining track portions following the designated one is necessary or not. When decision is such that the erasure is necessary, erasing operation is performed for the remaining track portion in succession to the format writing on the designated track portion. Otherwise, the erasing operation is not performed for the remaining track portion, and information of the location of the record resulting from the format writing is subsequently stored in the control table.

4 Claims, 3 Drawing Sheets

13a
ERASURE WRITE LATCH
65
ERASING CLOCK PULSE GENERATOR
66
WRITE DRIVE CIRCUIT
67
71
72
75
HEAD POSITIONING UNIT
70
DATA END SIG.
62
MEMORY ADDRESS LATCH
SEGMENT TABLE
20
READ CIRCUIT
68
DRIVE SIG.
HEAD POSITIONING DRIVE CIRCUIT
76
WRITE DATA
READ DATA
SEEK SIG.
DISK DRIVE B
13b
DISK DRIVE C
13c
60
77
61
78
63
64
12
120
121
SEGMENT CALCULATOR
SEGMENT MEMORY
122
COMPARATOR
123
CONTROL CIRCUIT
10
CPU
CH
11

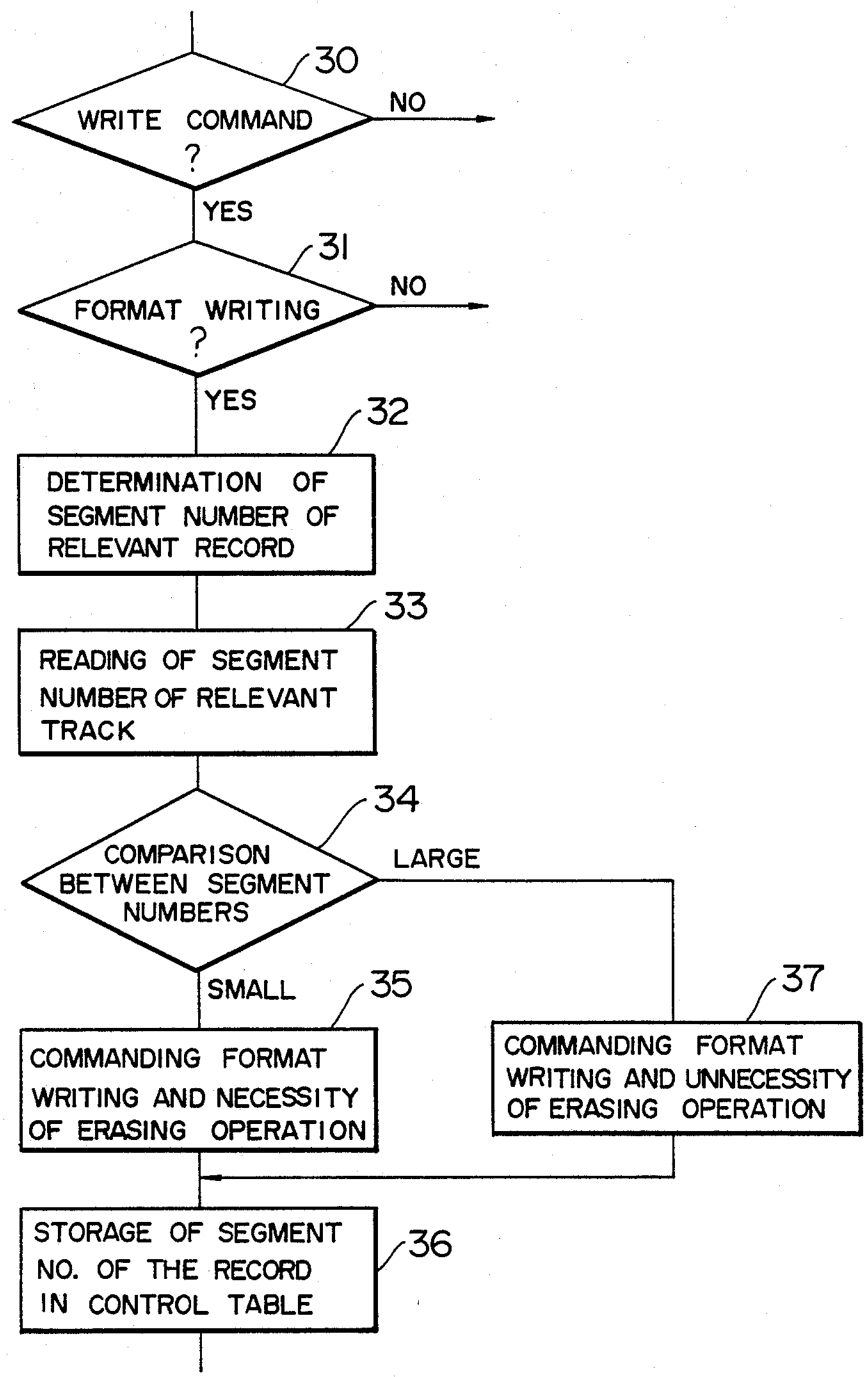
FIG. 3
30
WRITE COMMAND ?
NO
YES
31
FORMAT WRITING ?
NO
YES
32
DETERMINATION OF SEGMENT NUMBER OF RELEVANT RECORD
33
READING OF SEGMENT NUMBER OF RELEVANT TRACK
34
COMPARISON BETWEEN SEGMENT NUMBERS
LARGE
SMALL
35
COMMANDING FORMAT WRITING AND NECESSITY OF ERASING OPERATION
37
COMMANDING FORMAT WRITING AND UNNECESSITY OF ERASING OPERATION
36
STORAGE OF SEGMENT NO. OF THE RECORD IN CONTROL TABLE

METHOD OF CONTROLLING ERASING FOLLOWING FORMAT WRITING IN A MAGNETIC DISC APPARATUS

BACKGROUND OF THE INVENTION

1. Field of the Invention

The present invention generally relates to a method of controlling a magnetic disc apparatus, and more particularly concerns a method of controlling a data erasing operation of a storage disc system.

2. Description of the Related Art

In general, when data is to be newly written on a predetermined track of a disc having data recorded thereon already, a so-called format writing is required for recording control information and the like for the track. Following the format writing, an erasing operation for erasing the data recorded previously on the track (inclusive of the index marker of that track) is performed under the command of a disc controller. The aforementioned data is divided into record units or segments which are assigned sequential numbers.

In the case of the hitherto known magnetic disc system, when format writing is to be again carried out for recording new data on the track which has undergone an erasing operation after the previous format writing, as described above, the erasing operation is again performed on the portion of the track which underwent the previous erasing operation, involving wasteful consumption of the processing time, which is a disadvantage.

Parenthetically, a typical magnetic disc system capable of performing a record erasing operation is disclosed, for example, in U.S. Pat. No. 3,801,969 (corresponding to Japanese Patent Examined Publication No. 17692/1981) and Japanese Patent Examined Publication No. 18979/1981.

SUMMARY OF THE INVENTION

An object of the present invention is to provide a method of controlling a magnetic disc system in such a manner that an unnecessary erasing operation is prevented.

In view of the above object, it is proposed according to an aspect of the invention that a control table is provided for recording or storing control information about the erasing operation to be performed after a format writing operation, wherein upon occurrence of a request for a new format writing operation, it is determined on the basis of the control information contained in a control table whether or not an erasing operation is to be performed following the new format writing.

BRIEF DESCRIPTION OF THE DRAWINGS

FIG. 3 shows a flow chart for explaining the control method according to an embodiment of the present invention.

DESCRIPTION OF THE PREFERRED EMBODIMENTS

Now, the invention will be described in detail in conjunction with an exemplary embodiment thereof by referring to the accompanying drawings. The exemplary embodiment is directed to a disc storage system of known type in which there are provided a plurality of concentrically mounted magnetic discs driven at high speed with a respective access arm carrying a magnetic head being disposed in proximity to each disc. Recording tracks are provided on the discs in the form of concentric circles, and since the discs are aligned vertically, corresponding tracks on the respective discs form a cylinder. Thus, addressing of the storage space is effected by designating a cylinder number and a track number within that cylinder. However, it should be understood that the present invention is not limited to this type of system but is applicable to other systems having different addressing schemes as well.

GENERAL ARRANGEMENT

Figure 1:
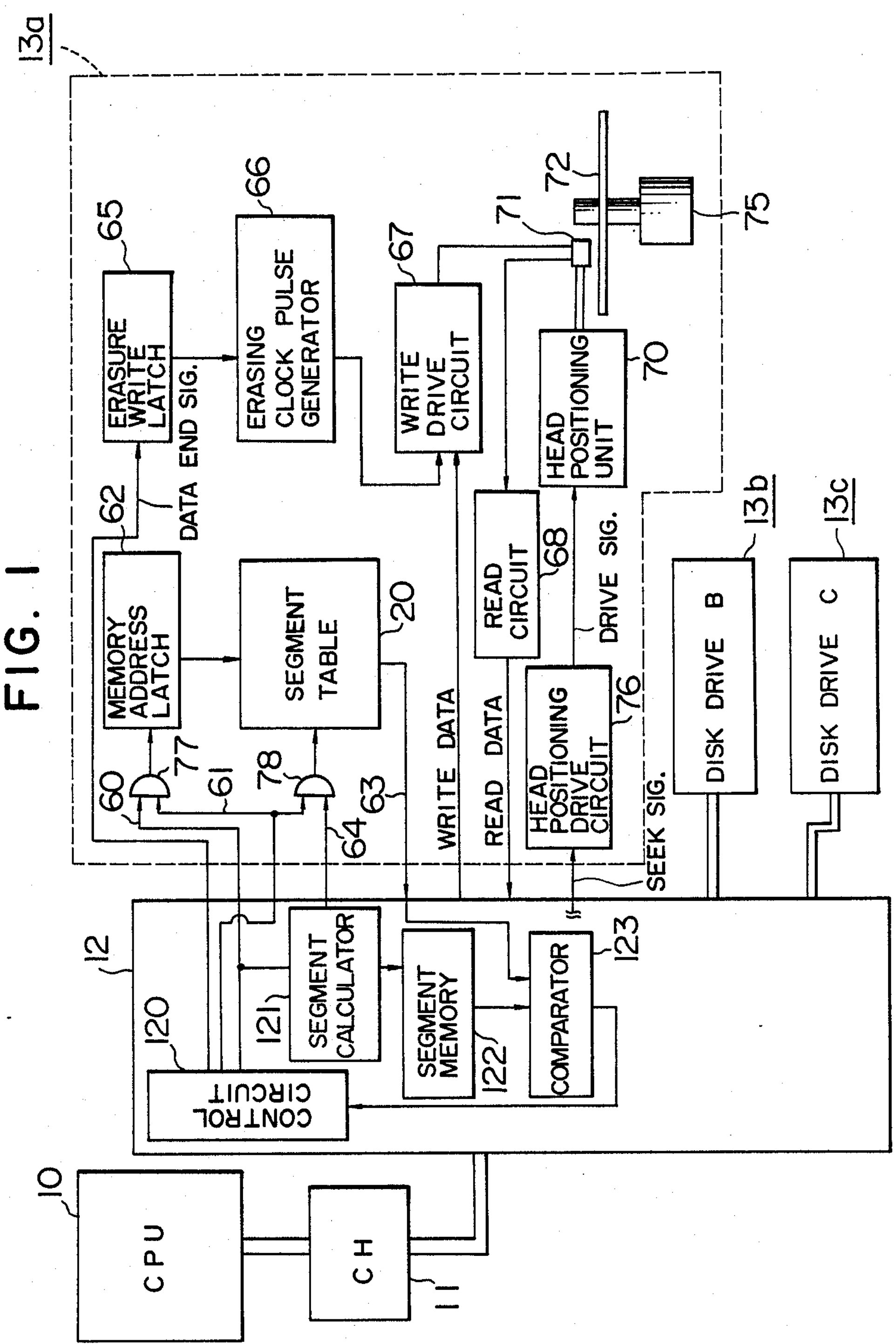
FIG. 1 is a view showing a general arrangement of a data processing system including a magnetic disc apparatus and a disc controller to which the invention can be applied.

The system shown in FIG. 1 is composed of a central processing unit (CPU) 10 for performing an arithmetic operation and other data processings, a channel (CH) 11 for controlling input/output operations, such as data transfer, a plurality of magnetic disc drive units 13*a*, 13*b* and 13*c*, and a disc controller 12 for controlling these magnetic disc drive units. The system is adapted to perform recording and reproduction of data onto or from magnetic discs driven by the units 13*a* to 13*c* under the command of the CPU 10 through the channel 11.

Data subjected to the recording/reproduction by means of the magnetic disc drives 13*a* to 13*c* is divided into units, each referred to as a record which in turn consists of a pure information recording portion and a control data recording portion (also referred to as an ID). The ID portion is designed to provide information indicative of the physical location of the record on the track (which information will hereinafter be referred to as a segment number). More specifically, assuming that a track is divided into a plurality of segments each of 32 bytes, for example, the segment numbers represent the absolute identification numbers which are allocated to these segments sequentially starting from the leading segment of the track.

WRITE/READ SYSTEM OF MAGNETIC DISC DRIVE

The following description will be confined to the magnetic disc drive 13*a*, it being understood that the magnetic disc drives 13*b* and 13*c* are identical thereto. Referring to FIG. 1, the magnetic disc drive 13*a* includes a write drive circuit 67, which is supplied with data to be written and operates to record the data on a magnetic disc 72 by means of a magnetic head 71, the disc being driven by a spindle motor 75. A head positioning drive circuit 76 is provided for positioning the magnetic head 71 on a desired track by actuating a head positioning mechanism 70 by a seek signal in response to a data reading command issued upstream, and a readout circuit 68, is provided for reading out data from the disc 72 through the head 71 to transfer the data upstream. An erasure writing latch 65 is activated (latched) by a data end signal issued upstream when an erasing operation is to be conducted upon completion of the data recording, and an erasing clock pulse generator 66 is provided for generating an erasing signal constituted by a string of "0s" or "1s" for the erasing operation upon activation of the latch 65. The circuits mentioned above serve for recording/reproduction and erasure of data. It should be mentioned that a servo disc and associated circuits for synchronizing the write/-read-out operations are omitted from illustration because they constitute no essential part of the invention.

DESCRIPTION OF MAJOR PORTION

In addition to the write/read circuits, the magnetic disc drive 13*a* further includes a segment table (also referred to as a control table) 20 for storing segment numbers corresponding to the last segment of the records for which a format writing and the erasing operation has been completed. The segment table 20 includes a plurality of memory or storage areas which can be identified on the basis of the cylinder number and track number of the record, wherein upon completion of the format writing for a given track, a segment number SN is stored in the storage area for that track corresponding to the last segment of the record to be modified. In the case of the illustrated embodiment of the invention, the segment number is arithmetically determined by the disc controller 12 on the basis of the record. The segment table memory 20 is peripherally provided with a memory address latch 62 and AND circuits 77 and 78 for performing the aforementioned control. In FIG. 1, a reference numeral 60 denotes an address signal for the format writing, 64 denotes a segment number signal corresponding to the address arithmetically determined by a segment calculator 121 in the disc controller 12 on the basis of the address signal 60, and 61 denote a gate signal.

Figure 2:
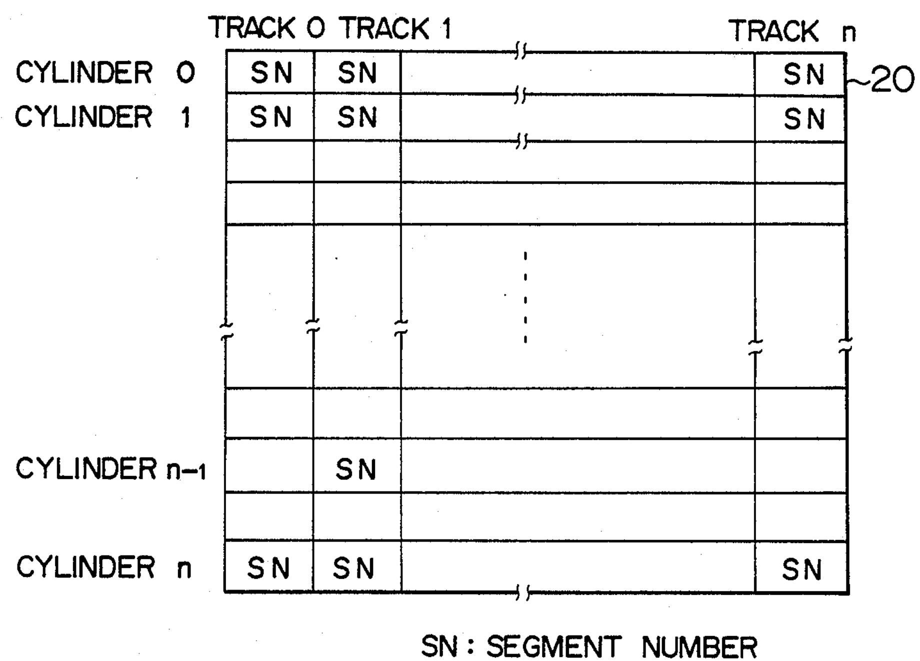
FIG. 2 is a view for illustrating in detail the contents of a segment or control table shown in FIG. 1.

FIG. 2 shows the contents of the segment table (memory) 20 which has a plurality of storage spaces or areas each defined by the cylinder number taken along the ordinate and the track number taken along the abscissa, the cylinder number and the track number constituting the address signal 60. Each storage area in the table 20 is assigned to a single respective track and stores a segment number for the particular track of a designated cylinder for which the format writing has been made, while any storage area for a track for which no format writing is made remains empty.

Next, description will be provided for the operation of the system shown in FIG. 1.

When the write command is issued to the magnetic disc drive 13*a* for the data supplied from the CPU 10 through the channel 11, the disc controller 12 produces the address signal 60 (including the cylinder and track designation) for the format writing instruction for the area on a disc in which the data is to be written, the segment number signal 64 derived from the address signal 60 by the segment calculator 121, and the gate signal 61. The address signal 60 is latched by the memory address latch 62 through the AND gate 77 and then is supplied to the segment table 20.

Upon receipt of the WRITE data, the format writing on the disc 72 is started by the write drive circuit 67. The latter performs the format writing on the basis of the WRITE data supplied from the controller 12, and at the same time the disc controller 12, receives the segment number signal 63 from a storage location in segment table 20 which corresponds to the address signal 60 inputted to the segment table memory 20 from the memory address latch 62. The disc controller 12 in turn determines whether the erasing operation will be necessary or not after completion of the format writing operation. To this end, the segment number of the previous record for the same track for which the format writing and erasing operation has been performed is compared with the instant or current segment number for that track. If the latter is larger than the former, i.e. if the erasing operation has been performed on the area associated with the current segment number on that track, the disc controller 12 issues to the magnetic disc drive 13*a* an instruction that the erasing operation is nt requested. On the other hand, when the segment number inputted currently is smaller than that of the previous record for that same track, the magnetic disc drive 13*a* is commanded to perform the erasing operation after the format writing of data is completed.

The operation outlined above is illustrated in a flow chart in FIG. 3. As a step 30, it is determined whether a write instruction is issued to the magnetic disc drive 13*a*. If so, then a decision is made at a step 31 whether the format writing is commanded or not. When the result of the decision steps 30 and 31 are affirmative (YES), the magnetic disc drive 13*a* consults the segment or control table 20 to determine the segment number of the last record (step 32), being followed by a step 33 where the segment number as determined is read out from the segment table 20. At a step 34, the current segment number is compared with the segment number associated with the erasing operation performed previously by the disc controller 22 for the same track. When the former is larger than the latter, it is commanded that the erasing operation is unnecessary (a step 37). Otherwise, the request for the erasing operation is issued at a step 35. Finally, at a step 36, the current segment number is stored in the segment table 20.

In conjunction with execution of the step 32 mentioned above, a control circuit 120 incorporated in the disc controller 12 of the system shown in FIG. 1 responds to the data writing instruction issued upstream to send out the address signal 60 to the magnetic disc drive 13*a*. The address signal 60 then is supplied to the segment table 20 through the memory address latch 62.

Also, the WRITE data for the format writing is supplied to the write drive circuit, to thereby initiate the format writing operation. Simultaneously, the content of the memory area of the table 20 corresponding to the inputted address signal, i.e. the segment number signal 63 in case the format writing has been performed previously for the track corresponding to that address signal 60, is supplied to a comparator 123. In the latter case, the comparator 123 compares this segment number signal 63 with the segment number stored in a segment memory 122 and allocated to the segment for which the current format writing operation is to be performed. In dependence on the result of this comparison, it is decided whether the aforementioned erasing operation is required or not. The segment number for the current format writing operation is arithmetically determined by a segment calculator 121 and is stored in the segment table 20 through the gate 78 in response to the gate signal 69. In this manner, the areas of the segment table 20 for which the format writing has been made are updated from time to time. The timing for transferring the various signals is controlled by the control circuit 120.

As will now be appreciated from the foregoing description, a decision is made as to whether the erasing operation is to be required following the current format writing by comparing the segment number of the record for which the format writing has been previously made with that of the record for which the format writing is to be performed currently, whereby an unnecessary erasing operation is prevented.

In the case of the illustrated embodiment, the comparison is made on the basis of the segment numbers. However, the invention is not restricted thereto. In other words, the comparison may be made by using the record numbers themselves. Further, the decision as to the necessity of performing the erasing operation may be made by the magnetic disc drive unit itself.

Further, by comparing the segment number of the last record with the segment number stored in the segment table 20 upon reading of the last record, the possibility of block drop-out may be checked.

It will now be understood that according to the invention, a table for storing control information as to the erasing operation following the format writing is provided so as to be dynamically referred to at the time of the format writing operation, whereby an unnecessary erasing operation which would otherwise be performed when the format writing has been completed can be eliminated. Thus, the time duration occupied by the disc drive can be correspondingly reduced, which in turn means that the format writing can be performed with improved efficiency.

In view of the fact that the format writing for addition of a record is frequently required in execution of ordinary jobs, the present invention makes a great contribution to the relevant field.

We claim:

1. A method of controlling a magnetic disc apparatus in the recording and erasing of data on selected ones of a plurality of tracks on a magnetic disc, each track being formed of a plurality of successive segments, comprising the steps of:

storing in a control table a segment location of the latest record written in a format for each of said plurality of tracks;

controlling said magnetic disc apparatus to write given data in a format on a designated portion including at least one segment of a selected track as a record;

comparing the segment location stored in said control table for said selected track with a segment location of the segment of said designated portion of said selected track on which said given data is written;

erasing a portion of said selected track following said designated portion only if said comparing step indicates a predetermined relationship between the segment location in said control table and the segment location of the segment of said designated portion; and updating said control table by storing therein for said selected track the segment location of the segment of said designated portion.

2. A method according to claim 1, wherein segments of each track are numbered sequentially and said control table stores segment locations in the form of segment numbers.

3. A method according to claim 2, wherein said comparing step comprises comparing a segment number stored in said control table for a selected track and the segment number of the segment of said designated portion of said selected track on which said given data is written in a format to determine which is larger.

4. A method according to claim 3, wherein said erasing step comprises erasing a portion of said selected track following said designated portion only when the segment number stored in said control table for said selected track is greater than the segment number of the segment of said designated portion of said selected track.

* * * * *